(12) United States Patent
Li (10) Patent No.: US 9,930,479 B2
(45) Date of Patent: Mar. 27, 2018

(54) METHOD, APPARATUS, AND MOBILE TERMINAL FOR COLLECTING LOCATION INFORMATION

(71) Applicant: Alibaba Group Holding Limited, George Town, Grand Cayman (KY)

(72) Inventor: Qi Li, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 14/879,635

(22) Filed: Oct. 9, 2015

(65) Prior Publication Data

US 2016/0105767 A1 Apr. 14, 2016

(30) Foreign Application Priority Data

Oct. 9, 2014 (CN) .......................... 2014 1 0528188

(51) Int. Cl.
*H04W 24/00* (2009.01)
*H04W 4/02* (2018.01)

(52) U.S. Cl.
CPC ..................... *H04W 4/02* (2013.01)

(58) Field of Classification Search
None
See application file for complete search history.

(56) References Cited

U.S. PATENT DOCUMENTS

| 2008/0186162 | A1 | 8/2008 | Rajan et al. |
| 2008/0303901 | A1* | 12/2008 | Variyath ................... G01S 5/02 |
| | | | 348/143 |
| 2010/0184378 | A1 | 7/2010 | Wakefield |
| 2010/0207721 | A1* | 8/2010 | Nakajima ............. G06F 21/552 |
| | | | 340/5.3 |
| 2010/0216429 | A1 | 8/2010 | Mahajan |
| 2010/0259386 | A1* | 10/2010 | Holley .................... G06Q 30/02 |
| | | | 340/568.1 |
| 2012/0268244 | A1 | 7/2012 | Ljung et al. |
| 2013/0326643 | A1* | 12/2013 | Pai .......................... G06F 21/88 |
| | | | 726/35 |
| 2015/0356328 | A1* | 12/2015 | Wassingbo ......... G06K 7/10009 |
| | | | 340/10.1 |

\* cited by examiner

*Primary Examiner* — Erika Washington
(74) *Attorney, Agent, or Firm* — Shun Yao; Park, Vaughan, Fleming & Dowler LLP (57) ABSTRACT

A self-reporting mobile device can allow a user to local the mobile device, regardless of whether the mobile device is reachable via a wireless or wired network. During operation, the mobile device can read one or more local data sources to obtain contextual information corresponding to a state of the mobile device. The mobile device can analyze the contextual information based on a condition for capturing location-identifying information for the mobile computing device to determine whether the contextual information satisfies the condition. If so, the mobile device may collect location-identifying information from one or more sensors of the mobile device, and can upload the location-identifying information to a server. Making this location-identifying information available on the server can facilitate a user to locate the mobile computing device.

15 Claims, 6 Drawing Sheets

METHOD, APPARATUS, AND MOBILE TERMINAL FOR COLLECTING LOCATION INFORMATION

RELATED APPLICATION

Under 35 U.S.C. 119, this application claims the benefit and right of priority of Chinese Patent Application No. 201410528188.7, filed 9 Oct. 2014.

BACKGROUND

Field

This disclosure is generally related to communication technologies. More specifically, this disclosure is related to a method, an apparatus, and a mobile terminal for collecting location information.

Related Art

Advancements in low-power circuits, battery technologies, and cellular and wireless networks has resulted in the proliferation of various types of mobile computing systems. In many cases, consumers prefer to perform their computing tasks on laptops, tablet computers, and smartphones over traditional desktop (non-mobile) computers. Moreover, computers are also being integrated into everyday consumer products, such as Internet-enabled automobiles and smart watches.

With such mobile devices, a user may communicate with another user, access the Internet, or perform other online tasks anytime and anywhere. However, due to their small size and/or their portability, such mobile devices are oftentimes lost, or stolen by others. If the owner cannot find the mobile device, the owner typically has to purchase a replacement with his own money. Unfortunately, for many users, these mobile devices are too expensive for them to be able to replace them once they're lost or stolen.

Typically, when a user loses a mobile device, such as a smartphone, the user may attempt to contact his lost device using another device that is capable of achieving real-time communication with the lost device. For example, if the user cannot locate his smartphone, the user may attempt using a telephone or cellular phone to call the smartphone, or to activate an alert on the smartphone over a computer network. In response to such a communication request, the smartphone may generate an audible or visual alert, such as by vibrating, playing a ringtone, or generating an alert that may allow the user to locate the smartphone.

Unfortunately, the user may not be able to locate the smartphone in this way if the user is not near the smartphone (e.g., in the same room), the smartphone has lost battery power, the smartphone is turned off, or the smartphone is in a silent mode of operation. To make matters worse, any attempts to locate the smartphone by remotely accessing a Global Positioning System (GPS) sensor of the smartphone will not work if the smartphone is not in a powered-on state (e.g., the device is turned off or has lost power), does not have a cellular or wireless network connection, or is not reachable over a network for any other reason.

SUMMARY

One embodiment provides a self-reporting mobile computing device (also hereinafter referred to as a "mobile device") that can allow a user to locate the mobile device, regardless of whether the mobile device is reachable via a wireless or wired network. During operation, the mobile device can read one or more local data sources to obtain contextual information corresponding to a state of the mobile device. The mobile device can analyze the contextual information based on a condition for capturing location-identifying information for the mobile device to determine whether the contextual information satisfies the condition. If so, the mobile device may collect location-identifying information from one or more sensors of the mobile device, and can upload the location-identifying information to a server. Making this location-identifying information available on the server can facilitate a user to locate the mobile device.

In some embodiments, the condition can include criteria for determining whether the power balance is less than or equal to a predetermined low-power threshold, and the mobile device can obtain the contextual information for the condition by reading a power balance from a power meter.

In some embodiments, the condition can include criteria for determining whether the time interval is greater than or equal to a predetermined time interval, and the mobile device can obtain the contextual information for the condition by determining a time interval since location-identifying information was last uploaded to the server.

In some embodiments, the condition can include criteria for determining whether the mobile device is entering a standby or power-down mode of operation, and the mobile device can obtain the contextual information for the condition by obtaining a mode of operation for the mobile device.

In some embodiments, the mobile device can collect the location-identifying information by obtaining a location identifier for a location of the mobile device, and/or capturing an image from an image sensor of the mobile device.

In variations on these some embodiments, the mobile device can insert the location identifier into the captured image, and/or can insert a matching timestamp into the location identifier and the captured image.

In some variations on these embodiments, the mobile device can identify a site corresponding to the captured image and the location identifier.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a self-reporting mobile computing device that solves the problem of allowing a user to find a mobile computing device, regardless of whether the mobile computing device is reachable via a wireless or wired network. For example, a user can create an account with an online tracking service that can receive location-identifying information from the user's mobile computing device under certain conditions or at certain time intervals. The tracking service can store recent location-identifying information in a storage repository, and can present this information to the user at a later time, such as if the user has misplaced his or her mobile device, or it has been stolen.

In some embodiments, the location-identifying information can include a Global Positioning System (GPS) location, a photograph, and a timestamp for the GPS location and photograph. In some variations, the location-identifying information can include information from other sensors or modules on the mobile computing device, such as audio from a microphone, a location or station identifier received from a cellular or Wi-Fi station, etc. The user may be able to interpret this additional information to determine who may be in possession of his mobile computing device or where it may be.

Figure 1:
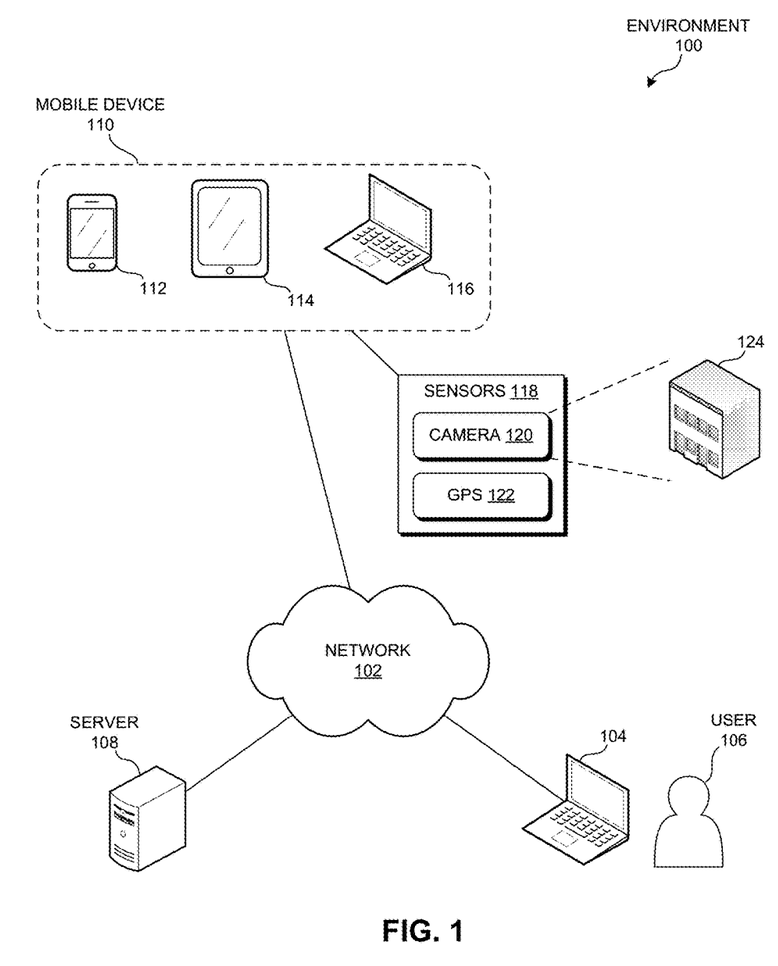
FIG. 1 illustrates a mobile device capturing location-identifying information to store on a server in accordance with an embodiment.

FIG. 1 illustrates a mobile device 110 using one or more sensors 118 to capture location-identifying information to store on a server 108 in accordance with an embodiment. For example, mobile device 110 may belong to a user 106. Mobile device can capture the location-identifying information either periodically, or under certain conditions, to make the information available for user 106. For example, mobile device 110 can include a condition-processing module that may process contextual information related to computing device 110 to determine when it may be necessary to gather new location-identifying information. If the contextual information satisfies a predetermined condition, mobile device 110 may use one or more sensors 118 to gather the location-identifying information.

In some embodiments, sensors 118 can include a camera 120 and a GPS sensor 122. Mobile device 110 may use camera 120 to capture an image of its surroundings (e.g., to capture an image of an identifiable building 124, a landmark, or a person in front of camera 120), and/or can use GPS sensor 122 to obtain location coordinates of mobile device 110. Alternatively, the mobile computing device may be able to determine a location without a GPS sensor, such as by obtaining a location identifier from a nearby Wi-Fi access point or cellular tower, or by deriving location coordinates using Wi-Fi triangulation or cell-tower triangulation.

Mobile device 110 may then package the data captured by sensors 118 and a timestamp to form the location-identifying information, and can upload the location-identifying information to server 108. Mobile device 110 may also store the location-identifying information in a local storage device, such as a non-volatile repository.

After the location information is stored in server 108, user 106 may obtain the location information from server 108 anytime, and thus may locate mobile device 110 according to the location information. For example, if at some point user 106 misplaces mobile device 110 or mobile device 110 is stolen, user 106 may use another computing device 104 to call or locate mobile device 110 via a network 102. However, in some instances, the user may not notice that mobile device 110 is missing until mobile device 110 has run out of battery, has been turned off (e.g., by a malicious user), or has lost network connection. In the case that user 106 cannot reach mobile device 110 via a network 102, user 106 can use computing device 104, such as a tablet device, a laptop computer, or a desktop computer, to obtain the location-identifying information from server 108.

In some embodiments, mobile device 110 may be any electronic or computing device that includes a network interface, and includes sensors capable of obtaining location or environmental information for the device. For example, mobile device 110 can include a smartphone 112, a tablet device 114, a laptop computer 116, a smart watch (not shown), or a network-enabled automobile (not shown) that may be capable of communicating over network 102. Network 102 can include any network for interfacing computing devices to each other, such as a cellular network, a wireless network, or the Internet. Network 102 can include an IP-based network, or can include a wireless ad-hoc network. Moreover, sensors 118 on mobile device 110 can include a microphone, one or more image sensors, an accelerometer or motion sensor, a gyroscope sensor, a magnetic sensor, a pressure sensor, a temperature sensor, or proximity sensor, or any type of sensor now known or later developed.

The process of locating device 110 does not depend on a special type of computing device 104, and does not require mobile device 110 to be powered on and in a working state during the process. In some embodiments, any device capable of accessing the Internet may be used to obtain the location-identifying information from server 108. During the device-locating process, if mobile device 110 has been powered off either automatically (e.g., due to low power) or manually, computing device 104 may access server 108 to obtain the location-identifying information that was uploaded by mobile device 110 to server 108 before being powered off.

Figure 2A:
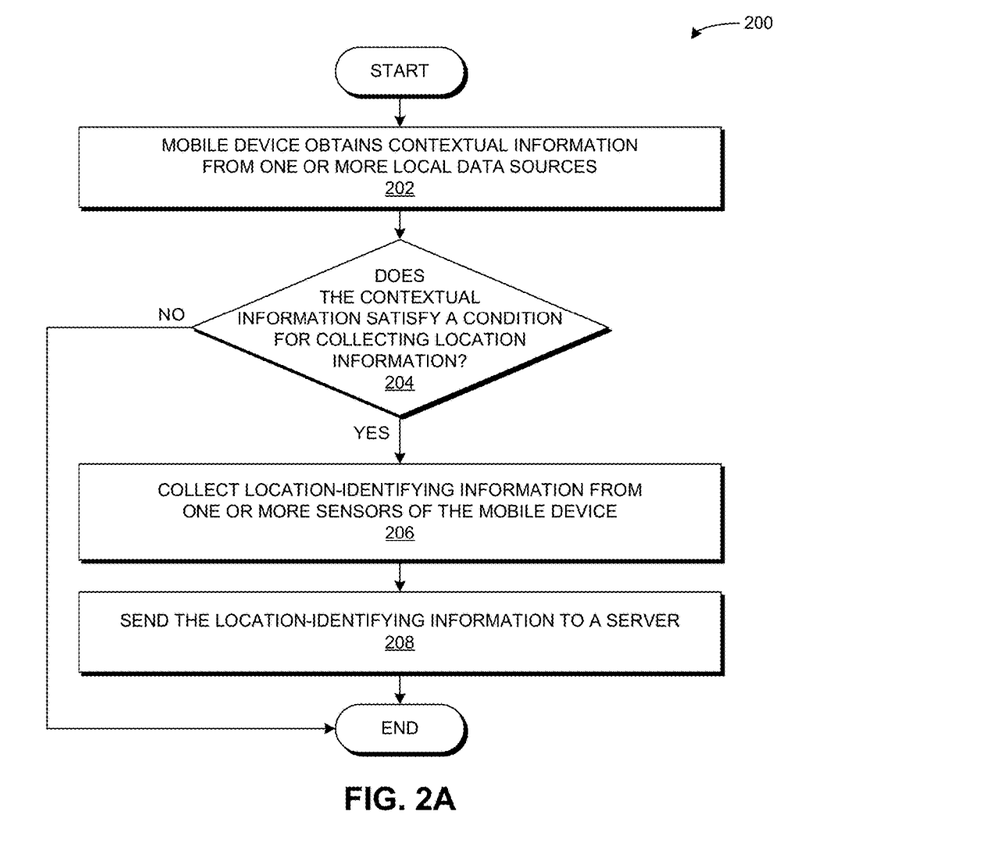
FIG. 2A presents a flow chart illustrating a method for collecting location-identifying information in accordance with an embodiment.

FIG. 2A presents a flow chart illustrating a method 200 for collecting location-identifying information in accordance with an embodiment. During operation, the mobile device can obtain contextual information from one or more local data sources (operation 202), such as from a timer, from one or more sensors, or from a local application (e.g., to obtain a device state from a local operating system). The mobile device can process the contextual information to determine whether this information satisfies a condition for collecting location information (operation 204).

If the condition is met, the mobile device can collect one or more types of location-identifying information from various sensors of the mobile device (operation 206), and may send the location-identifying information to a server (operation 208). On the other hand, if the contextual information fails to satisfy the condition, the location-information collection process may be terminated or postponed.

A condition can specify a type of sensor that is to be probed, and can specify criteria for when this sensor should be probed for location-identifying information. The condition can be defined to cause the computing device to collect the location-identifying information often enough to enable the user to locate the mobile device if it becomes unreachable. At the same time, the condition should not require collecting information so often that it would consume undesirably large amounts of battery power and/or network bandwidth.

In some embodiments, the condition may be evaluated periodically, or may cause the mobile device to periodically collect location-identifying information. For example, an exemplary condition may specify a time interval for collecting location-identifying information from a certain sensor. The mobile device may include a timing device which can keep track of the last time that location-identifying information was collected from this sensor, and may probe the sensor to collect new information if the time since the last sensor measurement is greater than the condition's time interval.

Periodically collecting the location-identifying information can prevent the case where the mobile device fails to collect the location information in case of an abrupt power-off of the mobile terminal. However, this periodic data collection can drain the mobile device's battery without providing much benefit to the user if the location-identifying information being collected does not change substantially over time.

To reduce the amount of battery power consumed by the data-collecting process, a condition can include additional criteria that further restricts when the mobile device is to collect and upload the location-identifying information. For example, the condition may specify that the mobile device may collect new location-identifying information if the mobile device's current location is at least a certain distance away from the previous collected location-identifying information. Hence, the mobile device may use geo-fencing with a radius specified in the data-collection condition to only upload the mobile device's location onto the server when the mobile device moves outside the radius of the previous uploaded location. Moreover, to prevent the mobile device from uploading information while the user is on-the-go (e.g., in a car), the condition may also specify that the device may need to be stationary for a predetermined time duration (e.g., 5 minutes) before collecting location-identifying information.

In some embodiments, the mobile device may be configured to collect location-identifying information more frequently than it uploads information to the server. For example, the mobile device may upload location coordinates to the server each time the mobile device captures a new image and location coordinates, but the mobile device may limit the number of images sent to the server per hour to reduce the amount of bandwidth and power consumption due to transferring large files over a wireless network.

In some embodiments, a certain information-collecting condition may be optimized to only collect and upload location-identifying information for when the mobile device may become unreachable in the near future. This condition can further reduce the amount of battery power consumed by the data collection process by not uploading recent location-identifying information to the server while the mobile device is in a normal mode of operation. If the user loses the mobile device while it has sufficient power and wireless network signal strength, the user may query the mobile device itself for new location-identifying information.

On the other hand, if the power balance of the mobile device drops below a predetermined power threshold, or the mobile device has been switched to an "off" or "standby" state, the mobile device may probe one or more sensors to obtain new location-identifying information prior to going offline. The mobile device may also upload the new location-identifying information to the server, prior to going offline, to make this information available for the user via the server. Then, if the user needs to locate the mobile device at a later time while the mobile device is powered off or has otherwise become unreachable over a network, the user may sill locate the mobile device using the location-identifying information that the mobile device uploaded to the server.

Figure 2B:
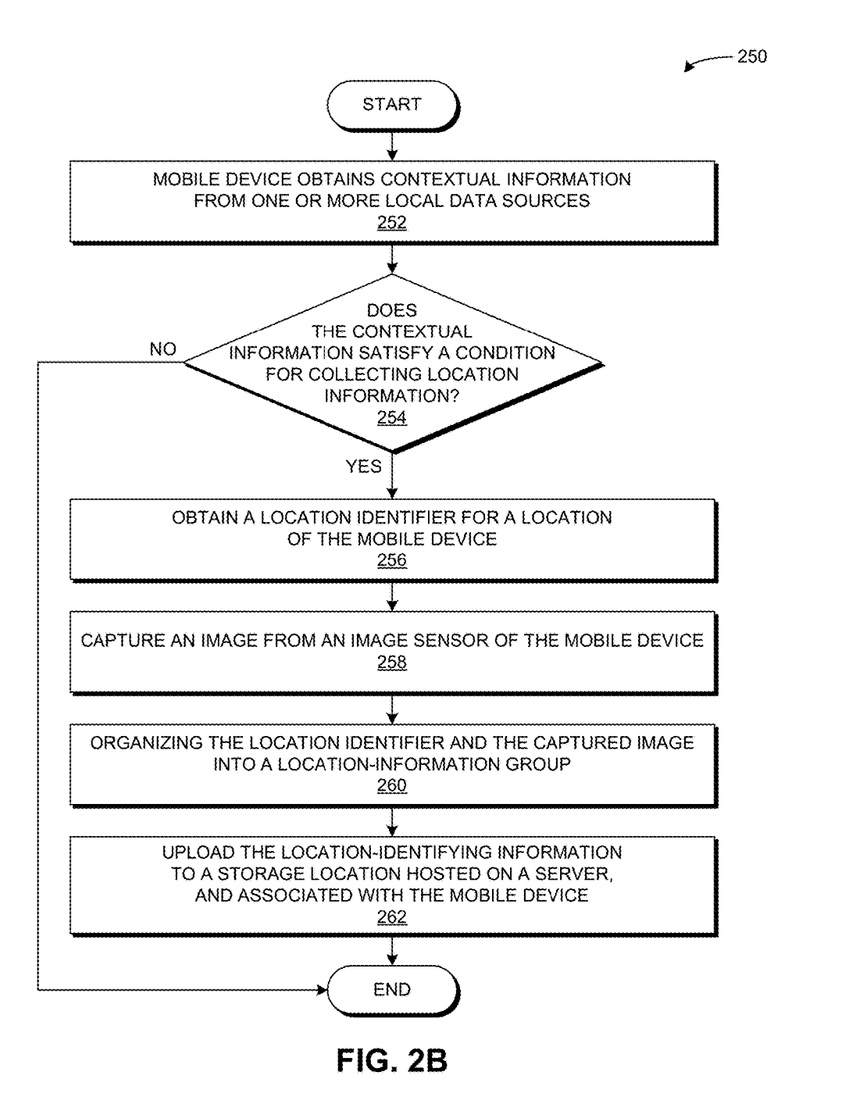
FIG. 2B presents a flow chart illustrating a method for grouping image and location data into a collecting of location-identifying information in accordance with an embodiment.

FIG. 2B presents a flow chart illustrating a method 250 for grouping image and location data into a collection of location-identifying information in accordance with an embodiment. During operation, the mobile device can obtain contextual information from one or more local data sources (operation 252), and can process the contextual information to determine whether this information satisfies a condition for collecting location information (operation 254).

If the condition is met, the mobile device can obtain a location identifier for a location of the mobile computing device, (operation 256) and can also activate an image sensor of the mobile computing device to capture an image (operation 258). To obtain the location identifier, the mobile device may read location coordinates (e.g., longitude and latitude information) from a positioning sensor on the mobile device (e.g., from a GPS sensor), or may perform Wi-Fi triangulation or cell-tower triangulation. Moreover, when the image sensor is activated, the mobile device may pick up one or more scenario photos of the mobile device's surroundings (e.g., from a front-facing camera and a rear-facing camera on a smartphone).

The mobile device can then organize the location identifier and any captured images into a location-information group (operation 260). For example, the mobile device may embed the location identifier into a captured image, and/or can assign a timestamp to the captured image. The mobile device may store the location-information group in a local repository of the mobile device, and may also upload the location-identifying information to the storage server (operation 262).

In some embodiments, when the user accesses the location-identifying information from the server, the user may use the corresponding location coordinate information to determine a general geographic region of the mobile device, such as an office building. However, the coordinate information may not lead the user directly to the mobile device, such as when the location coordinates lead the user to a multi-story building, or when the mobile device is not in plain sight. To locate the mobile device, the user can identify a specific physical site or point-of-view (e.g., a table, or a park bench) from the last image captured by the mobile device. Hence, in some embodiments, the location information and the captured image may correspond to the same or substantially similar time instances.

To prevent the user trying to locate his mobile device using a captured image and coordinate information that do not correspond to each other, the mobile device and the storage server can store the captured image and the coordinate information as a group of location information. During operation 260, for example, the storage device may group the captured image with the coordinate information by adding the location information to the captured image in the form of text embedded as metadata of the captured image, or text overlaid on top of the captured image.

As another example, the mobile device may assign the same timestamp to the location identifier and the captured image (e.g., the time at which the location-identifying information was gathered). This way, when the user queries the server to obtain the location-identifying information, the server may return a captured image and a location identifier that have matching timestamps (e.g. the data with the most recent timestamp).

In some embodiments, the storage server may store the location-identifying information in a storage location or storage account associated with the mobile device, and/or associated with the owner of the mobile device. For example, the user may register one or more of his mobile devices to an account on the server. The storage server may then assign a storage quota to the user's account. In some embodiments, the storage quota allows the user a certain amount of storage space within a storage space pool shared with a plurality of users.

In some other embodiments, the server may assign the storage quota by allocating a limited amount of storage space on the server for the user's account. When the mobile device generates location-identifying information, the mobile device may first store the location-identifying information in a local storage space of the mobile device, and may then upload (e.g., synchronize) any changes to the storage space on the local storage space to the user's allocated storage space on the server.

The user may use an application (e.g., a web browser) on any computing device to log into the user's account on the server via a computer network (e.g., the Internet). Because the storage space on the server is synchronized with the local storage space since the mobile terminal, the user may obtain recent and/or historical location-identifying information from the storage server.

In some embodiments, the user may register a plurality of mobile devices to the storage space associated with his account on the server. For example, two mobile devices, such as a smartphone and a tablet computer, of the same user may share the same network account. These two mobile devices may upload their location-identifying information to the storage space in the server corresponding to the user's account. The user may then use an application on any computer to access the location-identifying information of any mobile device associated with the user's account, such as location-identifying information for the smartphone, or for the tablet computer.

Figure 3A:
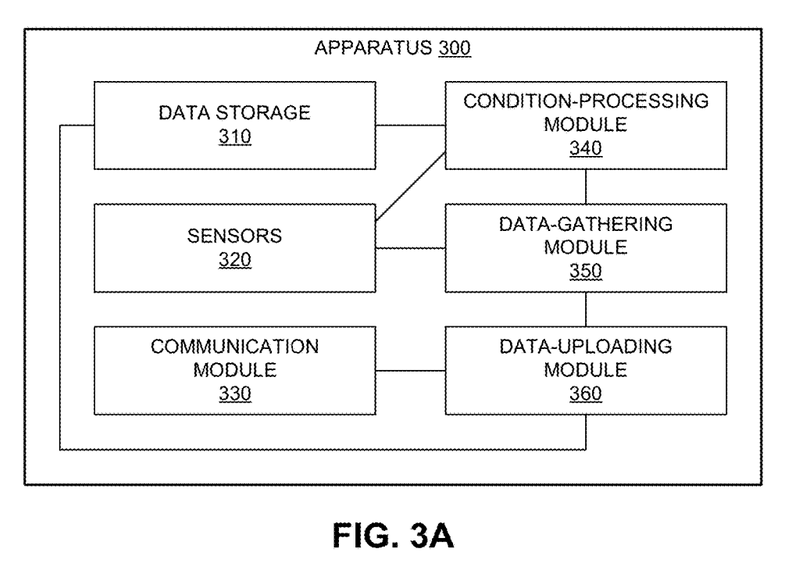
FIG. 3A illustrates an exemplary apparatus that captures location-identifying information to store on a server in accordance with an embodiment.

FIG. 3A illustrates an apparatus that captures location-identifying information to store on a server in accordance with an embodiment. Apparatus 300 can include a plurality of modules which may communicate with one another via a wired or wireless communication channel. Apparatus 300 may be realized using one or more integrated circuits, and may include fewer or more modules than those shown in FIG. 3. Further, apparatus 300 may be integrated in a computer system, or realized as a separate device which is capable of communicating with other computer systems and/or devices. Specifically, apparatus 300 can include a data storage module 310, a set of sensors 320, a communication module 330, a condition-processing module 340, a data-processing module 350, and a data-uploading module 360.

In some embodiments, data storage module 310 can store recent contextual information and state information for apparatus 300, and can store location-identifying information that has been generated by apparatus 300. Sensors 320 can include one or more physical sensors that can measure environmental attributes, such as a GPS sensor, a compass, an image sensor, an elevation sensor, a microphone, a power meter, a signal-strength meter for a wireless radio, etc. Communication module 330 can include a wired or wireless interface for communicating over a computer network, such as an Internet Packet (IP)-based network, an ad-hoc network (e.g., via Bluetooth or Wi-Fi), etc.

Condition-processing module 340 can analyze contextual information and/or state information from storage device 310 to determine whether apparatus 300 (e.g., a mobile device) satisfies one or more conditions for collecting and uploading location-identifying information to the server. Data-gathering module 350 can collect the types of location-identifying information that correspond to the satisfied conditions by obtaining measurements from the corresponding sensors, and may organize the collected information into a group of location-identifying information. Data gathering module 350 may pass the group of location-identifying information to data-uploading module 360, which may use communication module 330 to upload the group of location-identifying information to the server, or may store the group of location-identifying information in data storage 310. In some embodiments, data-uploading module 360 may synchronize the contents of data storage 310 to a storage location on the server.

Figure 3B:
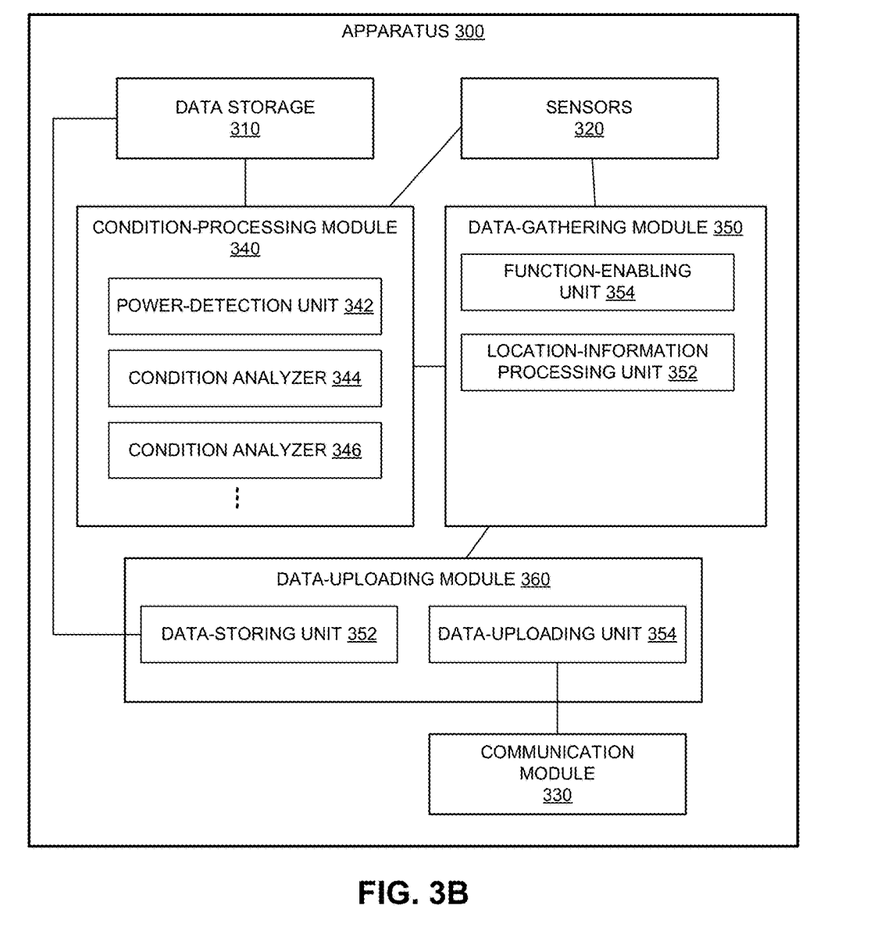
FIG. 3B illustrates exemplary apparatus components for determining when or how to capture location-identifying information in accordance with an embodiment.

FIG. 3B illustrates components of apparatus 300 for determining when or how to capture location-identifying information in accordance with an embodiment. In some embodiments, condition-processing module 340 may include one or more units that each evaluates a different predetermined condition. If any of the contextual information satisfies any of these conditions (or a group of inter-dependent conditions), the corresponding unit may configure data-gathering module 350 to gather the location-identifying information that corresponds to the satisfied condition(s). For example, power-detection unit 342 can periodically measure a power meter in sensors 320, and may determine whether the measured power level is below a predetermined low-power threshold specified in the corresponding condition. If the power level is below the low-power threshold, power-detection unit 342 may configure data-gathering module 350 to collect location-identifying information from an image sensor and a GPS sensor (e.g., from sensors 320).

In some embodiments, condition analyzers 344 and 346 may be related to inter-dependent conditions, and each may evaluate a different condition. For example, condition analyzer 344 may evaluate a time interval since the last location-identifying information was captured and uploaded. If the time interval is greater than a minimum threshold, condition analyzer 344 may configure apparatus 300 to activate condition analyzer 346 (and/or any another condition analyzer). This allows apparatus 300 to evaluate a condition path formed by a combination of two or more conditions. If the contextual information satisfies the conditions in the path, data-gathering module 350 may proceed to collect location-identifying information from sensors 320 identified by one or more conditions in this path.

As another example, condition analyzer 346 may evaluate a geo-fencing condition that causes apparatus 300 to collect and upload location-identifying information when the mobile device moves to a new location, and/or has been stationary at a given location for at least a predetermined time duration.

In some embodiments, data-gathering module 350 can include a function-enabling unit 354 that can activate one or more of sensors 320 that correspond to a satisfied condition, to gather location-identifying information associated with that condition. For example, function-enabling unit 354 can activate an image sensor to capture an image, and can activate a GPS sensor to obtain location coordinates for apparatus 300. Data-gathering module 350 can also include a location-information processing unit 352 that can organize the captured image and location coordinates into a group of location-identifying information.

Data-uploading module 360 can include a data-storing unit 352 that can be configured to store the location information to a local storage space in the mobile terminal. Moreover, data-uploading module 360 can include a data-uploading unit 354 that can be configured to upload (e.g., synchronize) the data stored in the local storage space with a predetermined storage space on a server corresponding to a server account for apparatus 300 or its user. Uploading the contents of data storage 310 to the server can ensure that recent location-identifying information is available on the server when the user needs to locate apparatus 300.

Figure 4:
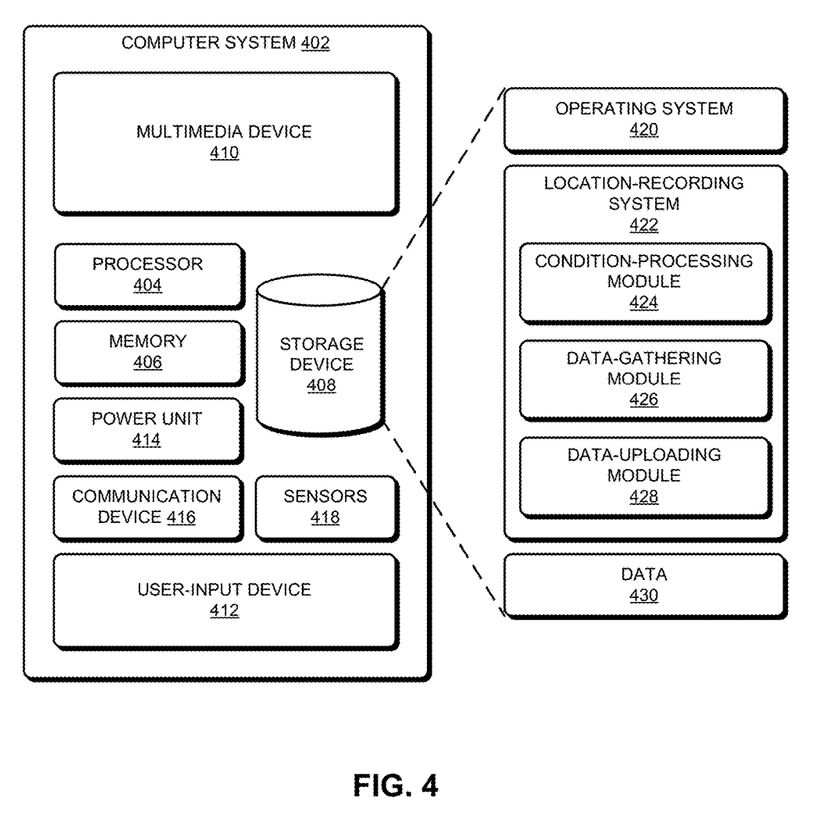
FIG. 4 illustrates an exemplary mobile computer system that facilitates determining the computer system's location, regardless of its operating status in accordance with an embodiment.

FIG. 4 illustrates a mobile computer system 402 that facilitates determining the computer system's location, regardless of its operating status in accordance with an embodiment. Computer system 402 can include a processor 404, a memory 406, and a storage device 408. Memory 406 can include a volatile memory (e.g., RAM) that serves as a managed memory, and can be used to store one or more memory pools. Storage device 408 can include any non-volatile storage medium that can store persistent data, such as a hard drive, a solid-state storage device (e.g., a flash drive), etc. Furthermore, computer system 402 can include or be coupled to a multimedia device 410, a user-input device 412, a power unit 414, a communication mechanism 416, and one or more sensors 418.

Storage device 408 can store operating system 420, a location-recording system 422, and data 430. Location-recording system 422 can include instructions, which when executed by computer system 402, can cause computer system 402 to perform methods and/or processes described in this disclosure.

Specifically, location-recording system 422 may include instructions for analyzing contextual information and/or state information to determine whether this information satisfies one or more conditions for collecting and uploading location-identifying information to the server (condition-processing module 424).

Further, location-recording system 422 can include instructions for collecting the types of location-identifying information that correspond to the satisfied conditions by obtaining measurements from the corresponding sensors, and for organizing the collected information into a group of location-identifying information (data-gathering module 426). Location-recording system 422 can also include instructions for uploading a group of location-identifying information to a server (e.g., using communication device 416), or for storing the group of location-identifying information in data storage 408 (data-uploading module 428).

Data 430 can include any data that is required as input or that is generated as output by the methods and/or processes described in this disclosure. Specifically, data 430 can store at least contextual information for computer system 402, one or more conditions for collecting location-identifying information, and a repository of recent and/or historical location-identifying information.

In some embodiments, storage device 408 may also store various types of data and software modules to support the operations of mobile computer system 402. For example, storage device 408 can store instructions for any application or method operated on mobile computer system 402, and can store data for these applications or methods, such as contact data, phonebook data, messages, pictures, videos, and the like.

In some embodiments, processor 404 may execute the instructions of operating system 420 and location-recording system 422 to control overall operations of computer system 402, such as the operations associated with presenting information on multimedia device 410, initiating and managing telephone calls, communicating data over a network, camera operations, and recording operations. Processor 404 may comprise one or more processing units to execute local or remote instructions to perform all or a part of the steps in the above-described methods. In addition, processor 404 may comprise one or more hardware modules, and may execute one or more software modules, which facilitate the interaction between processor 404 and other components of computer system 402. For example, processor 404 may comprise a multimedia module that manages an interface between processor 404 and multimedia device 410.

Power unit 414 can provide power to various components of computer system 402. For example, power unit 414 can include a power management system, one or more power supplies, a battery, and other components associated with the generation, management, and distribution of power in the mobile computer system 402.

Multimedia device 410 can include a screen providing an output interface between computer system 402 and the user. In some embodiments, the screen may include a liquid crystal display (LCD). Multimedia device 410 may also include an audio component (e.g., at least one speaker) to output audio signals.

User-input device 412 can also include one or more interface devices included in or coupled to computer system 402, such as a keyboard, a mouse, a click wheel, a button, or the like. The buttons may include, but are not limited to, a home button, a volume button, a starting button, a locking button, a power or standby button, or a mouse button.

Moreover, in some embodiments, multimedia device 410 may include user-input device 412. For example, multimedia deice 410 may include a touch panel (TP) on an LCD screen to receive input signals from the user. The touch panel can include one or more touch sensors to sense touch gestures, multi-finger touch gestures, swipe gestures, and/or any other gestures on the touch panel. The touch sensors may not only sense a boundary of a touch or swipe gesture, but may also sense a period of time and a pressure associated with the touch or swipe gesture.

Sensors 418 can include one or more sensors to provide status assessments of various aspects of mobile computer system 402. For example, sensors 418 can include a microphone and one or more image sensors (e.g., a CMOS or CCD image sensor), such as a front-facing camera and/or a rear-facing camera. The front-facing camera and/or the rear-facing camera may receive external multimedia data while computer system 402 is in an operation mode, such as a photographing mode or a video mode. These cameras may include a fixed optical lens system, or may include focus and optical zoom capability. Moreover, the microphone can be configured to receive an external audio signal when mobile computer system 402 is in certain operating modes, such as a call mode, a recording mode, or a voice recognition mode. Computer system 402 can store the received audio signal in storage device 408, or can transmit the sensed audio signal via communication mechanism 416.

In some embodiments, sensors 418 can include an accelerometer or motion sensor, a gyroscope sensor, a magnetic sensor, a pressure sensor, a temperature sensor, or a proximity sensor. For example, computer system 402 can capture and process measurements from accelerometers or motion sensors to detect a change in position of computer system 402 or a component of computer system 402, and/or to detect an orientation or an acceleration/deceleration of computer system 402. Moreover, computer system 402 can capture and process measurements from one or more proximity sensors to detect a presence or absence of user contact with computer system 402, and/or to detect the presence of nearby objects without any physical contact with these objects.

Computer system 402 can use measurements from the pressure sensor to detect, for example, an open or closed status of computer system 402 (e.g., a laptop). Moreover, computer system 402 can use measurements from one or more temperature sensors to detect a change in temperature of computer system 402, one or more components of computer system 402, and/or an ambient temperature surrounding computer system 402.

Communication device 416 can be configured to facilitate communications, wired or wirelessly over an ad-hoc or IP-based network, between computer system 402 and other devices. For example, communication device 416 can include a radio that may access a wireless network based on a communication standard, such as Wi-Fi, 2G, or 3G, 4G, any communication standard now known or later developed, or a combination thereof.

In one exemplary embodiment, communication device 416 may receive a broadcast signal or broadcast associated information from an external broadcast management system via a broadcast channel. In one exemplary embodiment, communication device 416 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, computer system 402 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described location information collection methods.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
obtaining, by a mobile computing device from one or more data sources of the mobile computing device, contextual information corresponding to a state of the mobile computing device;
analyzing the contextual information based on a condition for capturing location-identifying information for the mobile computing device,
wherein obtaining the contextual information involves obtaining a power balance from a power meter, and wherein the condition includes criteria for determining whether the power balance is less than or equal to a predetermined low-power threshold; and
in response to determining that the contextual information satisfies the condition:
obtaining, by the mobile computing device, a location identifier for a location of the mobile computing device;
capturing an image from an image sensor of the mobile computing device;
in response to determining that a first timestamp for the location identifier matches a second timestamp for the image, associating the location identifier with the image; and
transmitting the location identifier and the associated image to a server, thereby facilitating a user to locate the mobile computing device by querying the server for the location identifier and the associated image.

2. The method of claim 1, wherein obtaining the contextual information further involves determining a time interval since location-identifying information was last uploaded to the server, and wherein the condition further includes criteria for determining whether the time interval is greater than or equal to a predetermined time interval.

3. The method of claim 1, wherein obtaining the contextual information further involves obtaining a mode of operation for the mobile computing device, and wherein the condition further includes criteria for determining whether the mobile computing device is entering a standby or power-down mode of operation.

4. The method of claim 1, further comprising:
inserting the location identifier into the captured image; and
inserting a matching timestamp into the location identifier and the captured image.

5. The method of claim 1, further comprising:
identifying a site corresponding to the captured image and the location identifier.

6. A non-transitory computer-readable storage medium storing instructions that when executed by a computer cause the computer to perform a method, the method comprising:

obtaining, by a mobile computing device from one or more data sources of the mobile computing device, contextual information corresponding to a state of the mobile computing device;

analyzing the contextual information based on a condition for capturing location-identifying information for the mobile computing device, wherein obtaining the contextual information involves obtaining a power balance from a power meter, and wherein the condition includes criteria for determining whether the power balance is less than or equal to a predetermined low-power threshold; and in response to determining that the contextual information satisfies the condition, collecting location-identifying information from one or more sensors of the mobile computing device:

obtaining, by the mobile computing device, a location identifier for a location of the mobile computing device;

capturing an image from an image sensor of the mobile computing device;

in response to determining that a first timestamp for the location identifier matches a second timestamp for the image, associating the location identifier with the image; and     transmitting the location identifier and the associated image to a server, thereby facilitating a user to locate the mobile computing device by querying the server for the location identifier and the associated image.

7. The storage medium of claim 6, wherein obtaining the contextual information further involves determining a time interval since location-identifying information was last uploaded to the server, and wherein the condition further includes criteria for determining whether the time interval is greater than or equal to a predetermined time interval.

8. The storage medium of claim 6, wherein obtaining the contextual information further involves obtaining a mode of operation for the mobile computing device, and wherein the condition further includes criteria for determining whether the mobile computing device is entering a standby or power-down mode of operation.

9. The storage medium of claim 6, wherein the method further comprises:

inserting the location identifier into the captured image; and     inserting a matching timestamp into the location identifier and the captured image.

10. The storage medium of claim 6, wherein the method further comprises:

identifying a site corresponding to the captured image and the location identifier.

11. A computer system, comprising:

a processor; and a storage device storing instructions that when executed by the processor cause the processor to perform a method, the method comprising:

obtaining, by a mobile computing device from one or more data sources of the mobile computing device, contextual information corresponding to a state of the mobile computing device;

analyzing the contextual information based on a condition for capturing location-identifying information for the mobile computing device, wherein obtaining the contextual information involves obtaining a power balance from a power meter, and wherein the condition includes criteria for determining whether the power balance is less than or equal to a predetermined low-power threshold; and in response to determining that the contextual information satisfies the condition, collecting location-identifying information from one or more sensors of the mobile computing device:

obtaining, by the mobile computing device, a location identifier for a location of the mobile computing device;

capturing an image from an image sensor of the mobile computing device;

in response to determining that a first timestamp for the location identifier matches a second timestamp for the image, associating the location identifier with the image; and transmitting the location identifier and the associated image to a server, thereby facilitating a user to locate the mobile computing device by querying the server for the location identifier and the associated image.

12. The computer system of claim 11, wherein obtaining the contextual information further involves determining a time interval since location-identifying information was last uploaded to the server, and wherein the condition further includes criteria for determining whether the time interval is greater than or equal to a predetermined time interval.

13. The computer system of claim 11, wherein obtaining the contextual information further involves obtaining a mode of operation for the mobile computing device, and wherein the condition further includes criteria for determining whether the mobile computing device is entering a standby or power-down mode of operation.

14. The computer system of claim 11, wherein the method further comprises:

inserting the location identifier into the captured image; and     inserting a matching timestamp into the location identifier and the captured image.

15. The computer system of claim 11, wherein the method further comprises:

identifying a site corresponding to the captured image and the location identifier.

\* \* \* \* \*